(12) United States Patent
Moulsley et al.

(10) Patent No.: US 7,124,343 B2
(45) Date of Patent: Oct. 17, 2006

(54) RADIO COMMUNICATION SYSTEM

(75) Inventors: Timothy J. Moulsley, Caterham (GB); Matthew P. J. Baker, Canterbury (GB)

(73) Assignee: Koninklijke Philips Electronic N.V., Eindhoven (NL)

( * ) Notice: Subject to any disclaimer, the term of this patent is extended or adjusted under 35 U.S.C. 154(b) by 478 days.

(21) Appl. No.: 10/268,471

(22) Filed: Oct. 10, 2002

(65) Prior Publication Data
US 2003/0100268 A1    May 29, 2003

(30) Foreign Application Priority Data
Nov. 16, 2001 (GB) .................................. 0127481.1
Nov. 30, 2001 (GB) .................................. 0128669.9
Apr. 3, 2002   (GB) .................................. 0207696.6

(51) Int. Cl.
G08C 25/02    (2006.01)
H04L 1/18    (2006.01)

(52) U.S. Cl. ........................................ 714/748

(58) Field of Classification Search ............ 714/748, 714/749, 750, 751, 752
See application file for complete search history.

(56) References Cited

U.S. PATENT DOCUMENTS 5,745,502 A * 4/1998 Khayrallah et al. ......... 714/751
6,606,313 B1 * 8/2003 Dahlman et al. ............ 370/347
6,871,078 B1 * 3/2005 Nishioka et al. ............ 455/522
2001/0032325 A1 10/2001 Fong et al. .................. 714/18

FOREIGN PATENT DOCUMENTS

WO     WO0135580     11/2000

* cited by examiner

*Primary Examiner*—James C. Kerveros
(74) *Attorney, Agent, or Firm*—Paul Im

(57) ABSTRACT

A radio communication system includes a communication channel for the transmission of data packets from a primary station to a secondary station. In operation, on detection of a data packet, the secondary station transmits an acknowledgement signal to the primary station to indicate the status of the received data packet, and resets a timer. While the timer is running, the secondary station modifies a characteristic of uplink transmissions. In one embodiment the modification includes the secondary station transmitting a negative acknowledgement for each time at which a data packet could have been transmitted if no indication of a data packet is received. In another embodiment the modification includes the secondary station altering a parameter relating to transmission of channel quality information to the primary station.

21 Claims, 2 Drawing Sheets

RADIO COMMUNICATION SYSTEM

The present invention relates to a radio communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other mobile radio systems.

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this requirement in UMTS, a High-Speed Downlink Packet Access (HSDPA) scheme is being developed which may facilitate transfer of packet data to a mobile station at up to 4 Mbps.

A conventional component of a packet data transmission system is an ARQ (Automatic Repeat reQuest) process, for handling data packets received in error. For example, consider downlink packet transmission from a Base Station (BS) to a Mobile Station (MS) in HSDPA. When the MS receives a data packet it determines whether the packet has been corrupted, for example using Cyclic Redundancy Check (CRC) information. It then transmits a signal in a field allocated for this purpose to the BS, with a first signal used as an acknowledgement (ACK), to indicate that the packet was successfully received, and a second signal used as a negative acknowledgement (NACK), to indicate that the packet was received but corrupted. The signals may for example be different codewords or the same codeword transmitted at different powers. The BS requires an appropriate position for a decision threshold to be set so that it can decode the ACK/NACK messages correctly.

Since packet transmission is typically intermittent, discontinuous transmission (DTX) may typically be employed, so that nothing is transmitted by the MS in the ACK/NACK field unless a data packet has been received. In a typical scenario, the probability of the MS failing to detect a data packet that has been sent might be 1%. In this case it is desirable for the BS to interpret the DTX as if it were a NACK, so that the packet may be retransmitted to the MS. Interpreting DTX as a NACK may be achieved either by offsetting the decision threshold at the BS towards the ACK signal, or by means of the MS transmitting a NACK in every ACK/NACK field which does not correspond to a packet with correct CRC, whether or not a packet was detected.

A problem with the MS transmitting in every ACK/NACK field is that uplink interference is significantly increased, and in addition MS battery life is reduced. This is a particular problem when the packet traffic is bursty (as is often the case), resulting in the MS being required to transmit in many ACK/NACK fields when no packet had been transmitted to it.

A problem with offsetting the threshold for deciding between ACK and NACK commands is that the transmit power of the ACK command needs to be increased (as discussed below) in order to achieve an acceptably low probability of an ACK being interpreted as a NACK. As the probability of the MS transmitting an ACK should be much greater than that of transmitting a NACK in a well-designed communication system, increasing the ACK transmit power will significantly increase the average transmit power required in the ACK/NACK field.

Consider a typical communication system which requires that the probability of misinterpreting an ACK as a NACK is less than 1% and the probability of misinterpreting a NACK as an ACK is less than 0.01%. Assuming that the probability of the MS not detecting a packet is 1%, then the probability of misinterpreting DTX as a NACK should be less than 1% (so that the combined probability of the MS not receiving a packet and its DTX being interpreted as an ACK is the same as the probability of misinterpreting a NACK as an ACK, i.e. less than 0.01%). Simulations for typical mobile communication channels have shown that offsetting the decision threshold towards ACK enough to ensure that the probability of misinterpreting DTX as an ACK is less than 1% has the effect of requiring the ACK power to be greater than the NACK power. This therefore means that offsetting the BS decision threshold results in the peak power requirement for the ACK/NACK field being determined by the ACK signal rather than the NACK signal.

An object of the present invention is to address the problems identified above.

According to a first aspect of the present invention there is provided a radio communication system having a communication channel for the transmission of data packets from a primary station to a secondary station, the secondary station having receiving means for receiving a data packet and acknowledgement means for transmitting a signal to the primary station to indicate the status of a received data packet, wherein the secondary station comprises means for resetting a timer on detection of an indication that a data packet has been transmitted to the secondary station and for modifying a characteristic of uplink transmissions until the timer expires.

Resetting the timer may involve starting a timer, if one is not already running, or restarting an already-running timer. In one embodiment the modification comprises the secondary station transmitting a negative acknowledgement for each time at which a data packet could have been transmitted if no indication of a data packet is detected. In another embodiment the modification comprises the secondary station altering a parameter relating to transmission of channel quality information to the primary station. These modifications enable optimisation of uplink channel characteristics depending on requirements for uplink interference, peak power levels and battery life. The timer would typically be implemented as a counter counting in predetermined units, for example milliseconds, frames, time slots, messages or other suitable units.

According to a second aspect of the present invention there is provided a primary station for use in a radio communication system having a communication channel for the transmission of data packets from the primary station to a secondary station, wherein means are provided for transmitting a data packet to the secondary station, for receiving a signal from the secondary station to indicate the status of a received data packet, for resetting a timer on receipt of an acknowledgement of receipt of a data packet by the secondary station and for modifying its handling of uplink transmissions until the timer expires.

According to a third aspect of the present invention there is provided a secondary station for use in a radio communication system having a communication channel for the transmission of data packets from a primary station to the secondary station, wherein receiving means are provided for receiving a data packet from the primary station and acknowledgement means are provided for transmitting a signal to the primary station to indicate the status of a received data packet, wherein means are provided for resetting a timer on detection of an indication that a data packet has been transmitted to the secondary station and for modifying a characteristic of uplink transmissions until the timer expires.

In a further embodiment of the present invention, a timer may also be used to control the frequency of reporting channel quality information to the primary station.

According to a fourth aspect of the present invention there is provided a method of operating a radio communication system having a communication channel for the transmission of data packets from a primary station to a secondary station, the method comprising the secondary station receiving a data packet and transmitting an acknowledgement signal to the primary station to indicate the status of a received data packet, wherein the secondary station resets a timer on detection of an indication that a data packet has been transmitted to the secondary station and modifies a characteristic of uplink transmissions until the timer expires.

Embodiments of the present invention will now be described, by way of example, with reference to the accompanying drawings, wherein.

In the drawings the same reference numerals have been used to indicate corresponding features.

Figure 1:
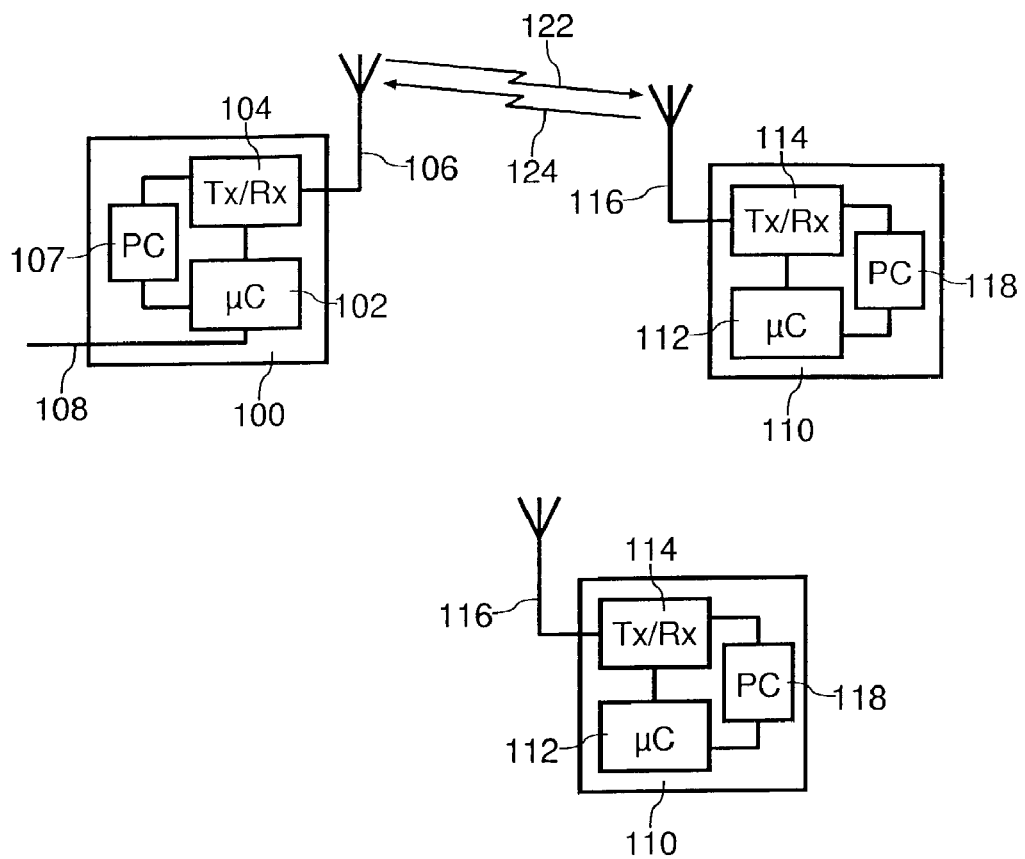
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
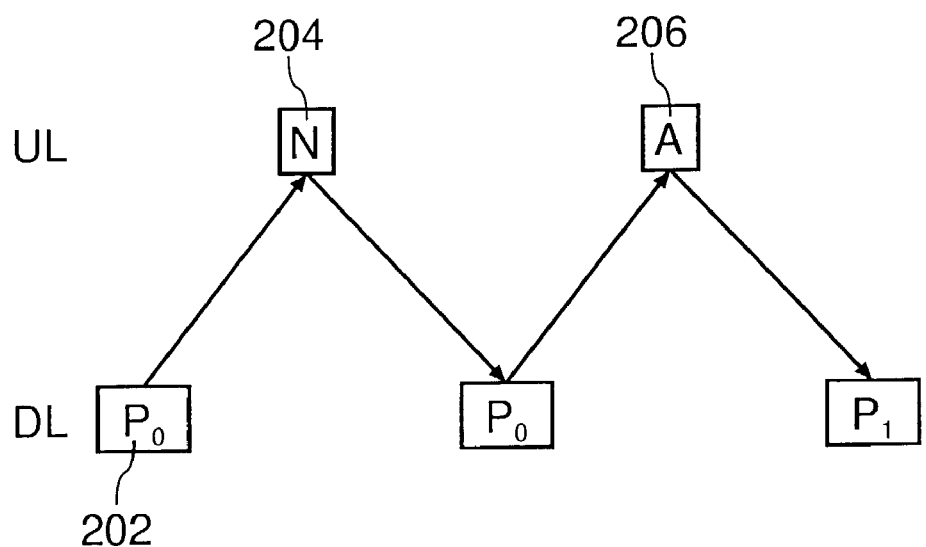
FIG. 2 is a diagram illustrating operation of a known stop-and-wait ARQ scheme.

An example of the operation of a known stop-and-wait ARQ scheme is illustrated in FIG. 2. Data packets 202, identified as $P_n$ where n is a one-bit sequence number, are transmitted in allocated time slots on a downlink channel (DL) 122 from a BS 100 to a MS 110. The first data packet $P_0$, with sequence number 0, is received in a corrupted state by the MS 110, which therefore transmits a negative acknowledgement (N) 204 in a field reserved for transmission of positive and negative acknowledgements. In response to this the BS 100 retransmits the first data packet 202, which this time is received correctly by the MS 100 which transmits an acknowledgement (A) 206. The BS 100 then transmits the next packet, with sequence number 1. The BS 100 also retransmits a data packet 202 if it receives no acknowledgement within a predetermined time-out period (in case the MS 110 did not receive the packet at all or the acknowledgement was lost). If the MS 110 did in fact receive the previously transmitted packet 202 it can determine that the received packet 202 is a retransmission as it has the same sequence number as the previous packet.

Figure 3:
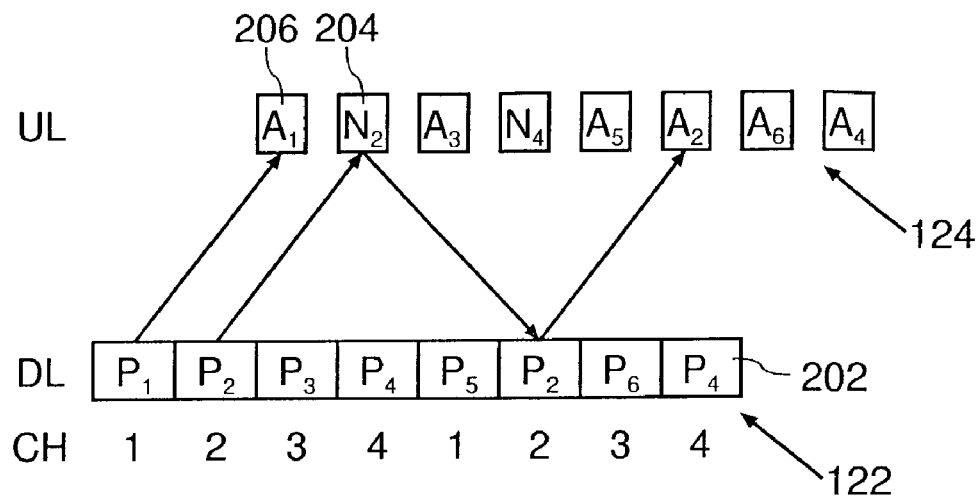
FIG. 3 is a diagram illustrating operation of a known n-channel ARQ scheme.

Improved throughput can be obtained by use of multi-channel ARQ schemes. An example of a 4-channel ARQ scheme operating in known manner is illustrated in FIG. 3. Data packets 202, identified as $P_n$ where n is a sequence number, are transmitted in sequence on a downlink channel (DL) 122 from a BS 100 to a MS 110. Each packet 202 is assigned to a logical channel (CH) in turn, starting with the first packet. Hence, packet $P_1$ is assigned to channel 1, packet $P_2$ to channel 2 and so on. ARQ is performed separately for each channel.

In the illustrated scenario, the first data packet $P_1$ is sent via the first logical channel and is received correctly by the MS 110, which transmits an acknowledgement ($A_1$) 206 on an uplink channel 124. Hence, when channel 1 is next scheduled for transmission, the next packet awaiting transmission, $P_5$ is selected and transmitted to the MS 110. Similarly, the second data packet $P_2$ is sent via the second logical channel. However, this packet is not received correctly by the MS 110, which issues a negative acknowledgement ($N_2$) 204. Hence, when channel 2 is next scheduled for transmission, packet $P_2$ is transmitted again. This time it is correctly received, and an acknowledgement 206 is issued on the uplink channel 124, thereby freeing channel 2 to transmit further packets 202.

It is likely for most applications that DTX would be applied in the ACK/NACK field for much of the time, given the typically intermittent nature of packet data transmission. In addition, for a well configured system, NACKs 204 should be sent significantly less often than ACKs 206. However, as discussed briefly above, there are problems associated with arranging for the BS 100 to interpret DTX as a NACK.

These problems are solved in a system made in accordance with the present invention by arranging for the MS 110 to operate in two states: a first state in which packet transmissions are expected; and a second state in which packet transmissions are not expected. The transition between these two states is controlled by a timer. The timer would typically be implemented as a counter counting in predetermined units, for example milliseconds, frames, time slots, messages or other suitable units.

Figure 4:
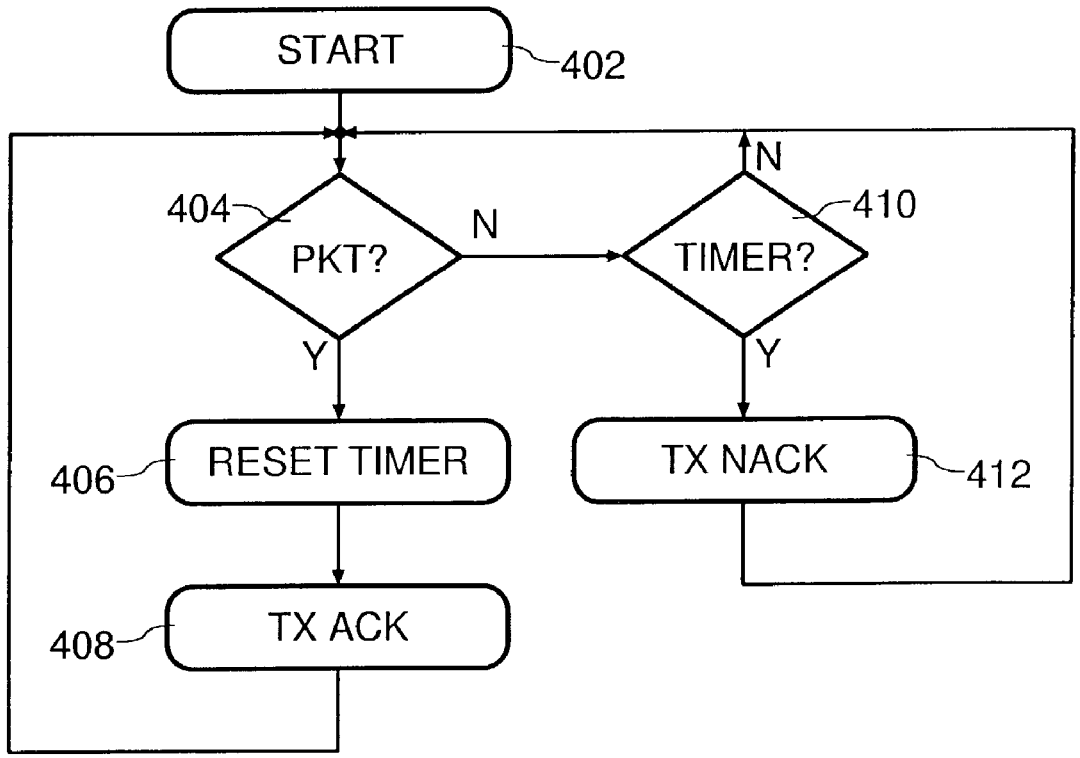
FIG. 4 is a flow chart showing a method of operating a packet data transmission system in accordance with the present invention.

The operation of such a system will be explained with reference to the flow chart shown in FIG. 4. The method starts, at step 402, when the MS 110 is ready to receive data packets 202. Test 404 relates to the MS 110 determining whether a data packet for it is transmitted in a time slot when such a packet could be transmitted. If a data packet 202 is detected the test 404 is passed, the timer is reset, at step 406, an acknowledgement 206 is transmitted, at step 408, and the MS 110 returns to test 404 to check the next suitable slot for a data packet 202. Resetting the timer may involve starting a timer, if one is not already running, or restarting an already-running timer.

If no packet is detected, the test 404 is failed and a further test 410 is made to determine whether the timer is running. If the timer is running, the test 410 is passed and the MS 110 transmits, at step 412, a negative acknowledgement 204 in the corresponding ACK/NACK field, then returns to test 404. If the timer is not running, test 410 is failed and the MS 110 returns directly to test 404.

The MS 110 could assume that a packet could be transmitted to it in any time slot, or there could be a period (significantly shorter than the timer period) after a packet 202 has been received during which no packets could be transmitted to that MS 110 and hence the MS would not transmit in the ACK/NACK field, depending on defined capabilities of the MS 110. When the timer stops, the MS 110 stops transmitting in the ACK/NACK fields until a packet 202 is next detected.

This scheme enables the BS 100 to adjust its decision threshold so that the transmit powers of the MS 110 may be optimised. In one embodiment of the present invention, the BS 100 offsets its decision threshold towards the ACK signal for the first packet $P_0$ of a sequence, to increase the probability of DTX being interpreted as NACK. This also has the effect of increasing the probability of an ACK 206 of the first packet being interpreted as a NACK 204. As soon as the BS 100 detects an ACK 206 in respect of the first packet $P_0$, it resets the threshold for subsequent decisions back towards the DTX level, and the BS 100 starts its own timer corresponding to the timer running in the MS 110.

As a result, the problem of interpreting a DTX as an ACK 206 is avoided for all packets 202 except the first $P_0$ in each sequence, thereby enabling the ACK/NACK power levels to be optimised to reduce interference or to increase cell range or battery life, depending on requirements.

In one embodiment of the present invention, the average power requirement for the ACK/NACK field is minimised. This could be useful in a system where it is desirable to minimise the uplink interference or to maximise the battery life of the MS 110. In this embodiment, the decision threshold is moved closer to the DTX level, together with a reduction in the ACK power and an increase in the NACK power. Our co-pending unpublished United Kingdom patent application 0126421.7 (Applicant's reference PHGB 010185) discloses techniques for controlling the relative probabilities of errors in decoding ACKs and NACKs by varying their respective transmission powers which may be applied in this embodiment.

In another embodiment of the present invention, the peak power requirement for the ACK/NACK field is minimised. This could be useful in a system where the cell range for packet access is limited by the peak power requirement for the ACK/NACK field. In this case, the ACK and NACK transmit powers would be set to be equal, and the threshold at the BS 100 positioned to give the desired error rates.

In a preferred embodiment of the present invention, the MS 110 increases the transmit power of the first ACK 206 of a sequence, so that the probability of misinterpreting an ACK as a NACK is not increased so much by the offset in decision threshold applied by the BS 100 for the first packet $P_0$.

In a further preferred embodiment of the present invention, the timer runs for a predetermined number of time slots, during which no further packets will be transmitted to the MS 110. During this period ACKs 206 or NACKs 204, as appropriate, are repeated in every time slot. When the timer stops, transmission of ACKs 206 also stops (to prevent the case that the MS 110 fails to detect the next packet but continues to send ACKs with the result that the BS 100 believes that the packet which the MS 110 failed to detect has been received correctly). However, transmission of NACKs 204 is not stopped and may continue without causing problems until a packet is received correctly.

In practice it would be desirable to limit the maximum number of repeated NACKs 204 in order to save transmit power and limit interference. This limit could be determined by a second timer, the maximum value of which is either predetermined, set according to a higher layer parameter signalled by the BS 100 or negotiated between the BS 100 and MS 110. Typically the second timer would be set to stop after transmission of a specified number of NACKs. Use of such a limit has the advantage that the BS 100 is aware of how long it can wait before deciding whether or not a packet has been received correctly. The second timer may take a different value to the timer, and may also count in different units if required.

This embodiment can also be used in conjunction with other embodiments in which different power levels are set for ACK and NACK signals. The BS 100 could determine whether an ACK 206 or a NACK 204 was signalled by various methods, including coherent combination of a number of ACK/NACK repetitions, selection of the strongest signal and majority voting on the received signals. It could adjust its decision thresholds dynamically according to the number of ACK/NACKs to be processed, in order to achieve a specified quality of service.

When the MS 110 transmits an ACK 206, possibly repeated, its subsequent behaviour can either be to transmit DTX after the last ACK or to return to sending NACKs until the next packet is received or the NACK timer expires. The latter option is generally preferred as it avoids transmission of the DTX state, thereby avoiding the need for the BS 100 to offset its detection threshold and enabling the power for ACK transmissions to be reduced (although increased interference levels and MS 110 power consumption should also be considered).

The present invention can be applied to aspects of uplink signalling other than NACK signals. In its most general form the technique relates to altering characteristics of uplink signalling depending on whether or not a packet has been detected during a predetermined period before the signalling.

As an example of this more general applicability, in a further embodiment of the present invention the MS 110 makes changes to the transmission of Channel Quality Information (CQI) depending on the likely expectation of receiving a packet 202. CQI could be determined by measuring the channel quality of the downlink, for example in terms of Signal to Interference Ratio (SIR). The changes to CQI transmission could include varying the frequency of transmitting CQI, as well as the transmission format (number of bits) used and the transmission power level. For example, the MS 110 could transmit CQI in every available CQI field for a period defined by a timer after a packet is received 202. After a predetermined period of time, the MS 110 could reduce the frequency of transmitting CQI until another packet 202 is received.

In an embodiment where changes to both NACK and CQI signalling are made, the timer used to control the frequency of reporting CQI and the timer used to control NACK transmissions could either be the same or have different values. These values could be predefined (for example as a MS capability), or signalled to the MS 110 by higher protocol layers.

The discussion above relates to the MS 110 determining whether it has received a packet 202. In some embodiments, for example UMTS, the presence of a packet destined for a MS 110 is signalled by a packet indicator message on a packet indicator channel and/or a control channel distinct from the packet transmission channel. In such an embodiment, the trigger for starting the timer could require the correct decoding of an associated downlink control channel (including a CRC), in addition to the detection of a packet indicator. This should help to avoid spurious triggering of the timer by false detection of a packet indicator.

In our co-pending unpublished International patent application PCT/IB02/02834 (Applicant's reference PHDE 010247) a physical layer mechanism for recovering from the case where the BS misinterprets a NACK 204 as an ACK 206 is disclosed. This mechanism makes use of an additional codeword, REVERT, which informs the BS 100 that the MS 110 has received a transmission of a new packet 202 when it was expecting retransmission of the previous packet. In a variation on this scheme two REVERT codewords are used, to provide in addition a NACK or an ACK in respect of the new packet. The present invention could be used in conjunction with such a REVERT command, which could be signalled using a power offset from the NACK command, as disclosed in GB0126421.7.

In another embodiment of the present invention, when the MS 110 is operating in the first state (when packet packet transmissions are expected) it could transmit two different levels of NACK 204, depending on whether a packet indicator had been detected. For example, if no packet indicator were detected, the MS 110 could transmit a low-power NACK 204, such that probability of the NACK being misinterpreted as an ACK is 1% (which, in conjunction with a 1% probability of the MS 110 not receiving the packet indicator, gives a 0.01% probability of the BS 100 interpreting a NACK as an ACK). If a packet indicator is detected, the MS 110 transmits a high-power NACK 204, such that the probability of the NACK being misinterpreted as an ACK is 0.01%. These different types of NACK could also be distinguished by the transmission of different codewords.

In a further embodiment, the operation of uplink power control is modified by the detection of a packet, until the timer expires. In the soft handover state, where the MS 110 may receive simultaneous transmissions from more than one BS 100 (the members of the active set), the power of the uplink transmission is normally controlled by considering power control commands from all BSs in the active set. However, when a downlink packet is sent from one particular BS, then any uplink signalling in response to that packet should be directed at that BS. Thus, in order to achieve a suitable power for that radio link, the power of uplink transmissions should be determined primarily by the power control commands from that BS. Therefore, when a packet is received from a given BS 100, a timer is set, and the power of at least one of the ACK/NACK field, CQI field or the entire control channel is determined by power control commands from the same BS, until the timer expires. In the case that a subsequent packet is received from a different BS, then the timer may be reset and that BS may take contol of uplink power levels. These changes to uplink power control may take place separately from or in combination with other changes to ACK/NACK or CQI transmissions, as discussed above.

The above description is aimed at UMTS FDD (Frequency Division Duplex) mode. The invention could also be applied to TDD (Time Division Duplex) mode. In this case the fact that the uplink and downlink channel use different time slots at the same frequency (i.e. reciprocal channel) could reduce the need for signalling of channel information.

The description above related to the BS 100 performing a variety of roles relating to the present invention. In practice these tasks may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure involved in an embodiment of the present invention.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system comprising:
   a primary station;
   a secondary station;
   a communication channel for the transmission of data packets from the primary station to the secondary station;
   the secondary station comprising:
      receiving means for receiving a data packet;
      acknowledgement means for transmitting a signal to the primary station to indicate the status of reception of the data packet; and
      means for resetting a timer on detection of an indication that a data packet has been transmitted to the secondary station and for modifying a characteristic of uplink transmissions until the timer expires, wherein said timer controls a transition between a first state in which packet transmissions are expected and a second state in which packet transmissions are not expected.

2. The system as claimed in claim 1, wherein the indication of transmission of a data packet is transmitted on a different channel to that used for transmission of the data packet.

3. A primary station for use in a radio communication system having a communication channel for the transmission of data packets from the primary station to a secondary station, the primary station comprising:
   means for transmitting a data packet to the secondary station;
   means for receiving a signal from the secondary station to indicate the status of reception of the data packet;
   means for resetting a timer on receipt of an acknowledgement of receipt of the data packet by the secondary station; and
   means for modifying uplink transmissions until the timer expires, wherein said timer controls a transition between a first state in which packet transmissions are expected and a second state in which packet transmissions are not expected.

4. The primary station as claimed in claim 3, further comprising means for receiving a negative acknowledgement, for setting a threshold for determining whether a received signal is a positive or negative acknowledgement, and for setting the threshold at a different value while the timer is running compared to the value used after the timer has expired.

5. The primary station as claimed in claim 4, further comprising means for setting the threshold closer to the acknowledgement signal than the negative acknowledgement signal after the timer has expired and a packet has been transmitted to the secondary station.

6. A secondary station for use in a radio communication system having a communication channel for the transmission of data packets from a primary station to the secondary station, the secondary station comprising:

receiveng means for receiving a data packet from the primary station;

acknowledgement means for transmitting a signal to the primary station to indicate the status of reception of the data packet;

means for resetting a timer on detection of an indication that a data packet has been transmitted to the secondary station and for modifying a characteristic of uplink transmissions until the timer expires, wherein said timer controls a transitions between a first state in which packet transmissions are expected and a second state in which packet transmissions are not expected.

7. The secondary station as claimed in claim 6, further comprising means for delaying the resetting of the timer until a further indication of the transmission of a data packet, including error correction information, is successfully received.

8. The secondary station as claimed in claim 6, further comprising means for transmitting a negative acknowledgement, wherein such negative acknowledgement is only transmitted until the timer expires.

9. The secondary station as claimed in claim 7, further comprising means for transmitting the acknowledgement of the first packet received after expiration of the timer at a higher power than the acknowledgement of subsequent packets while the timer is running.

10. The secondary station as claimed in claim 7, further comprising means for transmitting positive and negative acknowledgements with substantially the same power.

11. The secondary station as claimed in claim 7, further comprising means for transmitting the negative acknowledgement at a first power if no indication of transmission of a data packet is detected and at a second power if an indication of transmission of a data packet is received but the data packet is not received correctly, wherein said first power is less than said second power.

12. The secondary station as claimed in claim 6, further comprising:

means for resetting a further timer in response to the indication that a data packet has been transmitted, and means for repeating acknowledgements until the timer expires and in that means are provided for repeating negative acknowledgements until the further timer expires.

13. The secondary station as claimed in claim 12, wherein the duration of the further timer is greater than the duration of the timer.

14. The secondary station as claimed in claim 8, wherein the available signal types further include a revert signal indicating a request for retransmission of a packet received prior to the most recently received packet.

15. The secondary station as claimed in claim 6, further comprising means for modifying a parameter relating to transmission of channel quality information to the primary station while the timer is running.

16. The secondary station as claimed in claim 15, wherein the parameter is one or more of the rate at which channel quality information is transmitted to the primary station; the format of channel quality information transmitted to the primary station; and the power at which channel quality information is transmitted to the primary station.

17. The secondary station as claimed in claim 15, wherein the timer relating to transmission of negative acknowledgements and the timer relating to transmission of channel quality information are the same.

18. The secondary station as claimed in claim 6, further comprising means for communicating substantially simultaneously with a plurality of primary stations, for receiving power control commands from each of the primary stations and for receiving a data packet from any one of the primary stations, and means for setting the power of uplink transmissions depending on power control commands received from the primary station which transmitted the packet while the timer is running and depending on power control commands received from all the primary stations when the timer has expired.

19. A method of operating a radio communication system having a communication channel for the transmission of data packets from a primary station to a secondary station, the method comprising the following acts performed by the secondary station:

receiving a data packet;

transmitting an acknowledgement signal to the primary station to indicate the status of reception of the datapacket;

resetting a timer on detection of an indication that the data packet has been transmitted to the secondary station; and modifying a characteristic of uplink transmissions until the timer expires, wherein said timer controls a transition between a first state in which packet transmissions are expected and a second state in which packet transmissions are not expected.

20. A communication device for use in a radio communication system having a communication channel for the transmission of data packets from a transmitting station to the communication device, said communication device comprising:

a receiver configured to receive a data packet from the transmitting station;

a transmitter configured to transmit an acknowledgement signal to the transmitting station indicating the status of the data packet;

a processor configured to reset a timer upon reception of the data packet by the communication device, wherein said timer controls a transition between a first state in which packet transmissions are expected and a second state in which packet transmissions are not expected.

21. A method of operating a communication device having a communication channel for the transmission of data packets from a transmitting station to a communication device, said method comprising the following acts performed by the communication device:

receiving a data packet from the transmitting station;

transmitting an acknowledgement signal to the transmitting station indicating the status of the data packet;

resetting a timer upon reception of the data packet by the communication device, wherein said timer controls a transitions between a first state in which packet transmissions are expected and a second state in which packet transmissions are not expected.

* * * * *